United States Patent [19]

Sakamoto et al.

[11] 4,406,535

[45] Sep. 27, 1983

[54] DEVELOPMENT APPARATUS

[75] Inventors: Koji Sakamoto, Tokyo; Nobuyuki Yanagawa, Chigasaki, both of Japan

[73] Assignee: Ricoh Company, Ltd., Japan

[21] Appl. No.: 315,734

[22] Filed: Oct. 28, 1981

[30] Foreign Application Priority Data

Nov. 1, 1980 [JP] Japan .................. 55-154046
Feb. 20, 1981 [JP] Japan ............... 56-22923[U]

[51] Int. Cl.³ ................. G03G 15/00; G03G 15/08
[52] U.S. Cl. ................. 355/3 DD; 355/14 D; 118/658
[58] Field of Search .............. 355/3 DD, 14 D; 118/657, 658

[56] References Cited

U.S. PATENT DOCUMENTS

| | | | |
|---|---|---|---|
| 4,007,707 | 2/1977 | Buchan et al. | 355/3 DD X |
| 4,181,422 | 1/1980 | Forgo et al. | 355/3 DD |
| 4,270,487 | 6/1981 | Terashima et al. | 355/3 DD X |
| 4,348,979 | 9/1982 | Daintrey | 355/3 DD X |
| 4,371,257 | 2/1983 | Nishikawa | 355/3 DD X |
| 4,373,798 | 2/1983 | Tsukada et al. | 355/3 DD |

*Primary Examiner*—A. C. Prescott
*Attorney, Agent, or Firm*—Guy W. Shoup; Robert Scobey

[57] ABSTRACT

A development apparatus for developing a latent electrostatic image formed on a latent electrostatic image bearing member to a visible image, having a development sleeve for transporting a developer to the latent electrostatic image for developing the same to a visible image, and a developer layer thickness regulating device for regulating the thickness of a developer layer on the development sleeve, in which development apparatus, the developer layer thickness regulation device comprises a pressure application member for applying pressure to the developer layer on the development sleeve by the magnetic force exerted on the pressure application member towards said developer transportation means, the pressure application member being supported so as to be movable in the direction substantially normal to the surface of the development sleeve.

20 Claims, 20 Drawing Figures

DEVELOPMENT APPARATUS

BACKGROUND OF THE INVENTION

The present invention relates to a development apparatus for use in an electrophotographic copying machine, for developing to a visible image a latent electrostatic image formed on a latent electrostatic image bearing member, by a developer carried by a developer transport member onto the latent electrostatic image bearing member.

A development apparatus of the type mentioned above for use in an electrophotographic copying machine or in an electrostatic recording apparatus is known. In such development apparatus, usually a two-component type developer comprising toner and carrier particles is employed, but a one-component type developer is occasionally employed in the development apparatus. In either case, it is necessary that the thickness of the developer layer carried on the developer transport member be small, since when the diameter of the carrier particles in the two-component developer is small, the thickness of the developer layer must be small. When a one-component type developer with high volume resistivity is employed, it is necessary that the developer be electrically charged by a development apparatus and, accordingly, the developer layer has to be extremely thin. Otherwise, only the surface portion of the developer layer, not the entire developer layer, is electrically charged.

Conventionally, in order to obtain a developer layer with the desired thickness, a doctor blade is employed as a developer layer control means for regulating the thickness of the developer layer on a developer transport member, which doctor blade is directed towards the developer transport layer and is capable of scraping excess developer from the developer transport member to regulate the thickness of the developer on the developer transport member. However, there is a limitation to the thickness of the developer that can be obtained by means of the doctor blade. Furthermore, when a thin developer layer is obtained by the doctor blade, it is necessary that the gap between the doctor blade and the developer transport member be small, and, if some foreign material happens to be mixed with the developer and the foreign material enters the small gap, the development cannot be done properly.

In order to prevent the above-mentioned disadvantage, a development apparatus capable of obtaining a layer of developer much thinner than the gap possible between a doctor blade, made of a magnetic material, and a developer transport member has been conventionally proposed. However, there is a practical limitation to the thickness of the developer that can be obtained by that development apparatus, and therefore it is extremely difficult to obtain a layer of developer with the desired thickness.

SUMMARY OF THE INVENTION

It is therefore an object of the present invention to provide a development apparatus capable of obtaining a developer layer on a developer transport member, which developer layer is extremely thin, in comparison with the thickness of the developer layer than can be obtained by conventional development apparatus.

According to the present invention, such a thin developer layer can be successfully obtained by bringing a pressure application member into pressure contact with the developer carried on the surface of the developer transport member. Furthermore, by disposing the pressure application member movable in the direction normal to the developer transport member, clogging of the gap between the developer transport member and the pressure application member with foreign material mixed with the developer can be eliminated, since the pressure application member can allow such foreign material to pass between the gap without any difficulty.

In the course of making the present invention, the most difficult problem with the pressure application member was that it was difficult to obtain the desired gap and to maintain the same by adjusting the gap between the developer transport member and the pressure application member.

According to the present invention, the pressure application member is constructed of an elastic blade, or a rigid plate, the position of which can be adjusted accurately, and the elastic blade or the plate is brought into pressure contact with the developer layer on the developer transport member by magnetic force, whereby the gap between the pressure application member and the developer transport member can be adjusted as desired.

Therefore, the key features of the present invention are (1) that the thickness of the developer layer on the developer transport member is regulated as desired by a pressure application member which is brought into pressure contact with the developer layer, (2) that the pressure application member is designed to be movable in the direction substantially normal to the surface of the developer transport layer, and (3) that the pressure application member is brought into pressure contact with the developer layer by use of magnetic force.

DETAILED DESCRIPTION OF THE PREFERRED EMBODIMENTS

Figure 1:
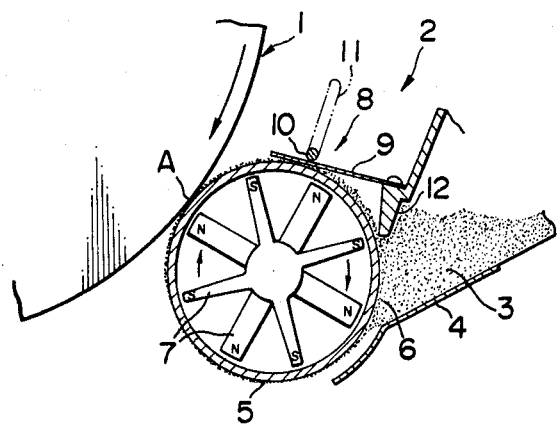
FIG. 1 is a schematic cross-sectional view of an embodiment of a development apparatus according to the present invention.

Referring to FIG. 1, there is shown an embodiment of a development apparatus according to the present invention, which is indicated by reference numeral 2. Reference numeral 1 represents a latent electrostatic image bearing member, which is a drum-shaped photoconductor 1 (hereinafter referred to as the photoconductor drum 1). As a matter of course, as the latent electrostatic image bearing member, a sheet-formed photoconductor (refer to FIG. 17) can be employed. A latent electrostatic image formed on the surface of the photoconductor drum 1 is developed to a visible image by the development apparatus 2.

The development apparatus 2 comprises a developer tank 4 which holds a one-component type developer comprising a magnetic developer 3, and a developer transportation member which is constructed in the form of a non-magnetic sleeve 5. The non-magnetic sleeve 5 is directed towards an inlet and outlet 6 of the developer tank 4.

Within the sleeve 5, there are disposed magnets 7 in such a manner that the opposite polarities thereof are positioned alternately along the inner peripheral surface of the development sleeve 5.

In the development apparatus 2 as shown in FIG. 1, the sleeve 5 is stationarily fixed, while the magnets 7 can be rotated clockwise.

When the copying operation is started, the photoconductor drum 1 is rotated in the direction of the arrow, that is, clockwise, so that a latent electrostatic image is formed on the surface of the photoconductor drum 1 by a latent electrostatic image formation means (not shown). With the rotation of the photoconductor drum 1, the thus formed latent electrostatic image is moved to a development area A where the sleeve 5 and the photoconductor drum 1 are positioned most closely.

At the same time, the magnets 7 disposed within the development sleeve 7 are rotated clockwise, so that the developer 3 held in the developer tank 4 is supplied onto the surface of the development sleeve 5 from the inlet and outlet 6 of the developer tank 4, to form a layer of the developer. As a result, the developer 3 is transported counterclockwise along the outer peripheral surface of the development sleeve 5. The thickness of the developer layer formed on the peripheral surface of the development sleeve 5 is then regulated to a predetermined thickness by a developer layer thickness regulation means 8 which will later be explained in detail. The developer layer whose thickness has been regulated to the predetermined thickness then comes to the above-mentioned development area A.

In the development area A, the developer on the development sleeve 5 is electrostatically attracted to the latent electrostatic image formed on the surface of the photoconductor drum 1, so that the latent electrostatic image is developed to a visible image. The developer which is not deposited on the surface of the photoconductor drum 1 is transported on the development sleeve 5, returning to the developer tank 4.

When development of this type is performed as described above, it is, as mentioned previously, necessary that the development layer be extremely thin. In order to obtain such a thin development layer, the previously mentioned developer layer thickness regulation means 8 is disposed downstream of the developer tank 4 and upstream of the photoconductor drum 1, in terms of the direction of the developer transportation.

In the present embodiment, the developer layer thickness regulation means 8 comprises an elastic blade 9 extending the entire width of the development sleeve 5, and a pressure application member 10 which is disposed on the upper side of the elastic blade 9.

In this embodiment, the pressure application member 10 is made of a rod-shaped magnetic material extending in the axial direction of the development sleeve 5. The pressure application member 10 is fitted in sliding contact with slots 11 formed in a pair of side walls (not shown). The slots 11 extend in the direction normal to the peripheral surface of the development sleeve 5 and, therefore, the rod-shaped pressure application member 10 can also be moved in the direction normal to the peripheral surface of the development sleeve 5.

One side portion of the elastic blade 9 is fixed to the developer tank 4 by screws and the other side portion is free and elastically flexible.

The pressure application member 10 is made of a magnetic material as mentioned above, and is attracted to the development sleeve 5 by the magnetic force of the magnets 7 disposed within the development sleeve 5. As a result, pressure is applied to the developer layer on the development sleeve 5 by the pressure application member 10 through the elastic blade 9, so that the amount of the developer which passes between the elastic blade 9 and the development sleeve 5 is regulated by the pressure applied to the developer layer by the pressure application member 10. Consequently, the developer layer which has passed through the developer layer thickness regulation means 8 is made as extremely thin as desired.

Figure 2:
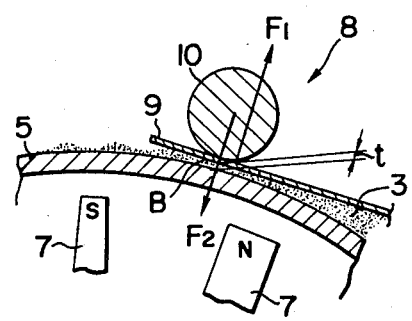
FIG. 2 is partially enlarged view of the development apparatus shown in FIG. 1.

More specifically by referring to FIG. 2, pressure $F_1$ is applied to the elastic blade 9 from the developer which passes through a gap B between the elastic blade 9 and the development sleeve 5. At the same time, pressure $F_2$ is also applied to the elastic blade 9 from the pressure application member 10 which is magnetically attracted to the magnets 7. As a matter of course, the pressure $F_2$ includes the weight of the pressure application member 10. Therefore, the space t of the gap B is determined by the balance between the pressures $F_1$ and $F_2$ and the amount of developer which can pass through the gap B is so small that the developer layer which has passed through the gap B is extremely thin.

As can be seen from the above explanation, since the space t of the gap B is determined by the magnitude of the magnetic force which is exerted on the pressure application member 10, the space t can be adjusted as desired by changing the magnitude of the magnetic force of the magnets 7. More specifically, it is required that the space t of the gap B be adjusted so as to obtain a developer layer with the desired thickness, and that the predetermined space t be uniform in the axial direction of the development sleeve 5. Such adjustment can be done without any difficulty by appropriate choice of the material and weight of the pressure application member 10.

Since the space t of the gap B can be determined by adjusting the magnetic force exerted on the pressure application member 10, slight eccentricities of the development sleeve 5, if any, do not affect the adjustment of the space t.

In contrast to this, when a conventional doctor blade is employed as a developer layer thickness regulation means, it is extremely important to take the eccentricities of the development sleeve into consideration in order to properly adjust the gap between the doctor blade and the development sleeve. Otherwise, that gap cannot be adjusted accurately enough for practical use.

Furthermore, in the present embodiment of a development apparatus according to the present invention, if any foreign material happens to be mixed with the developer which is transported along the development sleeve 5, it will not occur that the gap B between the elastic blade 9 and the development sleeve 5 becomes clogged with the foreign material, since the pressure application member 10, which applies pressure to the elastic blade 9, is movable along the slots 11, and the elastic blade 9 can be elastically deformed when the foreign material comes under the elastic blade 9, permitting easy passage of the foreign material under the elastic blade 9.

In the embodiment as shown in FIG. 1, in which the magnets 7 are driven in rotation, the intensity of the magnetic field in the area where the pressure application member 10 is located is always changing alternately. Accordingly, the previously mentioned pressure $F_2$ is also changing alternately. Therefore, is some sizable foreign material is mixed with the developer and happens to be positioned near the elastic blade 9, that foreign material can easily pass between the elastic blade 9 and the development sleeve 5. Thus, this embodiment of a development apparatus according to the present invention is capable of forming an extremely thin developer layer and, at the same time, is capable of preventing the clogging of the gap B between the elastic blade 9 and the development sleeve 5 with any sizable foreign material. If the gap B were to be clogged with such foreign material, streaks would appear on the developer layer on the development sleeve 5 and, accordingly, there would be a risk that corresponding streaks would appear on the developed visible images on the photoconductor 1. This risk is completely eliminated by the development apparatus as shown in FIG. 1.

As mentioned previously, when the intensity of the magnetic field applied to the pressure application member 10 is changed periodically, the pressure $F_2$ exerted on the elastic blade 9 is changed and, accordingly, the amount of developer which passes under the elastic blade 9 is also changed, slightly but periodically. However, the thickness of the developer layer which has passed under the elastic blade 9 is made uniform by the magnetic force exerted on the development layer before it comes to the development area A. Therefore, if there is a slight but periodic change in the amount of the developer which passes under the elastic blade 9, such change does not have any adverse effect on the development quality in practice.

Returning to FIG. 1, reference numeral 12 represents an auxiliary doctor blade for regulating the amount of the developer preliminarily before it comes to the elastic blade 9, in order to facilitate the regulation of the thickness of the developer layer by the elastic blade 9 and the pressure application member 10. The auxiliary doctor blade 12 can be omitted when it is thought to be unnecessary.

Figure 3:
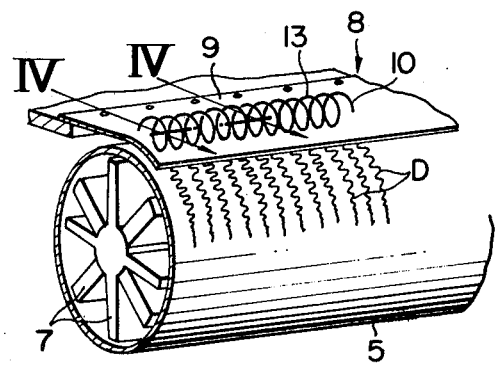
FIG. 3 is a partial perspective view of another embodiment of a development apparatus according to the present invention.
Figure 4:
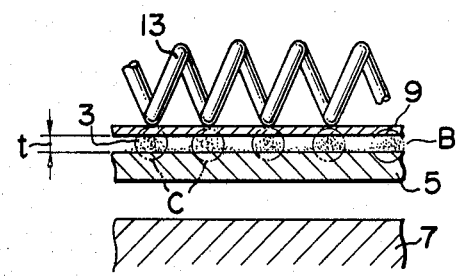
FIG. 4 is a partial enlarged cross section taken on line IV—IV in FIG. 3.

Referring to FIG. 3 and FIG. 4, there is partly shown another embodiment of a development apparatus according to the present invention.

In this embodiment, a coil spring 13 is employed as the pressure application member 10 of the developer layer thickness regulation means. The coil spring 13 is made of a magnetic material and is disposed on the elastic blade 9. The coil spring 13 can be movably supported by the opposite ends of the coil spring 13 which are movably fitted into the slots 11 (refer to FIG. 1) in the same manner as in the case of the pressure application member 10 in FIG. 1. Alternatively, the coil spring 13 can be supported by fixing the opposite ends thereof to the side walls (not shown) disposed on the opposite side ends of the development sleeve 5. Even if the coil spring 13 is supported in the latter manner, the main portion of the coil spring 13 is movable in the direction normal to the surface of the development sleeve 5 by the elasticity of the coil spring 13 itself.

This embodiment has the following advantages in addition to the advantages obtained by the first mentioned embodiment shown in FIG. 1.

In this embodiment, the intensity of the magnetic field in the areas, shown by reference symbol C in FIG. 4, between (i) the portions of the coil spring 13 which are in contact with the elastic blade 9 and (ii) the portions of the development sleeve 5 corresponding to the first mentioned portions of the coil spring 13, is greater than the intensity of magnetic field in the other areas between the elastic blade 9 and the development sleeve 5. Therefore, the developer 3 present in the gap B between the elastic blade 9 and the development sleeve 5 is in the shape of furrows extending in the axial direction of the development sleeve 5 as shown in FIG. 4. The convex portions of the developer layer on the development sleeve 5 push the elastic blade 9 upwards, that is, in the direction normal to the axial direction of the development sleeve 5, so that the space t of the gap B is increased by the convex portions. Therefore, in case some sizable foreign material is mixed in the developer 3, the gap B allows those foreign material to pass easily therethrough, so that clogging of the gap B with such foreign material can be prevented. On the other hand, even if the space t of the gap B is increased by the convex portions of the developer layer, there are formed concave portions in the developer layer as shown in FIG. 4. Therefore, the total amount of the developer present in the gap B is still small and accordingly the developer layer formed on the development sleeve 5 can be made extremely thin.

Immediately after the developer layer passes through the gap B, the above-mentioned convex and concave portions remain on the developer layer. However, in the course of transportation of the developer layer along the peripheral surface of the development sleeve 5, those convex and concave portions of the developer layer are gradually flattened by the magnetic force of the magnets 7 which are driven in rotation within the development sleeve 5.

Since the above-described convex and concave portions in the shape of furrows of the developer layer extend in the direction normal to the axial direction of the development sleeve 5, it may occur that those furrows formed in the developer layer are not flattened immediately by the magnets 7, which are also rotated in the direction normal to the axial direction of the development sleeve 5. In such a case, the furrows of the developer layer can be eliminated with greater speed and certainty by rotating the coil spring 13 by a driving apparatus (not shown). When the coil spring 13 is rotated, the pattern of contact of the coil spring 13 with the elastic blade 9 is a reciprocation within a predetermined range in the axial direction of the development sleeve 5. As a result, the furrows formed in the developer layer extend zigzag as shown by reference symbol D in FIG. 3. The furrows formed zigzag in the developer layer can be eliminated and flattened in a short time by the magnets 7 which are rotated along the inner peripheral surface of the development sleeve 5, whereby such a disadvantage that the convex and concave portions might remain in the developer layer when the layer comes to the development position A (refer to FIG. 1) can be completely eliminated.

In the above-described embodiments of a development apparatus according to the present invention, the magnets 7 disposed within the development sleeve 5 are driven in rotation, while the development sleeve 5 is stationary, whereby the developer 3 on the development sleeve 5 is transported to the development area A. However, the present invention is not limited to the development apparatus of such type, but the present invention can be applied to a development apparatus of the type in which the development sleeve 5 is rotated, while the magnets 7 are stationary, and to a development apparatus of the type in which both the development sleeve 5 and the magnets 7 are driven in rotation.

Figure 5:
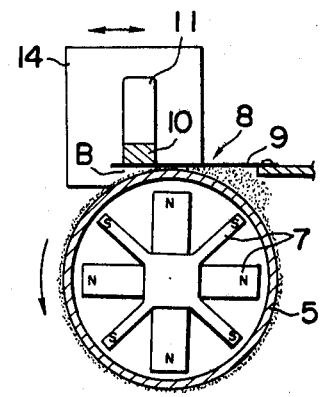
FIG. 5 is a schematic cross-sectional view of a further embodiment of a development apparatus according to the present invention.

Referring to FIG. 5, there is shown an embodiment of a development apparatus according to the present invention, in which the development sleeve 5 is rotated counterclockwise, while the magnets 7 are stationary. In this embodiment, the pressure application member 10 is disposed in such a manner as to be movable along the slots 11, whereby a sizable foreign material, if any, in the developer, can be passed easily through the gap B between the non-magnetic elastic blade 9 and the development sleeve 5. Furthermore, in this embodiment, a support member 14 for supporting the pressure application member 10 can also be moved horizontally in FIG. 5. By moving the support member 14 horizontally, the pressure application member 10 can also moved horizontally, whereby the space of the gap B can be adjusted so as to obtain a developer layer with the desired thickness. This construction can also be applied to the aforementioned embodiments.

In all of the above-described embodiments, the developer layer thickness regulation means 8 comprises the rod-shaped or coil-spring-shaped pressure application member 10 and the elastic blade 9.

Figure 6:
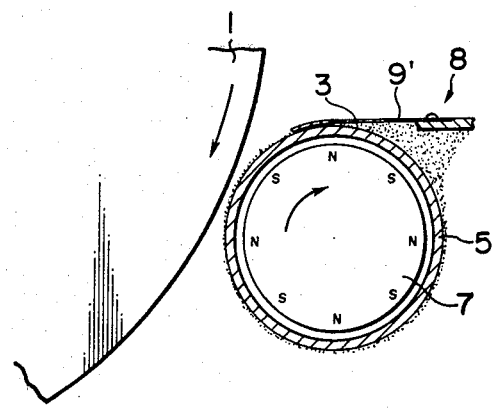
FIGS. 6 to 10 are schematic cross-sectional views of further embodiments of a development apparatus according to the present invention.

In contrast to such embodiments, in an embodiment of a development apparatus according to the present invention as shown in FIG. 6, the developer layer thickness regulation means 8 consists of an elastic blade 9' which is made of a magnetic material and serves as a pressure application member. One end portion of the elastic blade 9' is fixed, while the other end portion thereof is free and elastically flexible. The elastic blade 9' is movable in the direction normal to the surface of the development sleeve 5 and can apply pressure by magnetic force to the developer 3 on the development sleeve 5 to regulate the thickness of the developer layer on the development sleeve 5. An advantage of this embodiment is that the structure of the developer thickness regulation means 8 is simpler than those of the so far explained embodiments, while having the same function of regulating the thickness of the developer layer on the development sleeve 5 as that of the developer layer thickness regulation means 8 of the so far explained embodiments.

In the so far explained embodiments of a development apparatus according to the present invention, a magnetic developer is employed. However, the present invention can be applied to a development apparatus for use with a non-magnetic developer.

Figure 7:
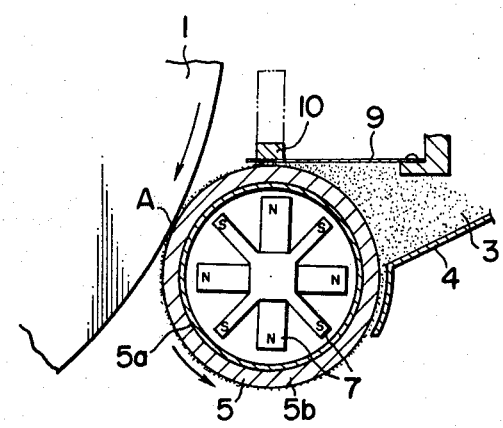

Referring to FIG. 7, there is shown an embodiment of a development apparatus according to the present invention, which is for use with a non-magnetic developer. This development apparatus is the so-called touch-down development apparatus. In this embodiment, the development sleeve 5 comprises a core member 5a and an electrically conductive elastic layer 5b which covers the core member 5a. When the development sleeve 5 is rotated counterclockwise, the non-magnetic developer 3 is supplied onto the surface of the development sleeve 5 and is carried along the surface of the development sleeve 5. In the development area A, the non-magnetic developer 3 is brought into contact with a latent electrostatic image formed on the photoconductor drum 1, whereby the latent electrostatic image is developed.

In this development apparatus, in order to regulate the thickness of the developer layer, there are disposed the elastic blade 9 made of a non-magnetic material and the pressure application member 10 made of a magnetic material, which are the same as those in the embodiment shown in FIG. 1. In a development apparatus of this type, since the non-magnetic developer is employed, magnets for transporting the developer along the development sleeve 5 are unnecessary. However, in the embodiment shown in FIG. 7, the magnets 7 are disposed within the development sleeve 5 in order to attract the pressure application member 10 towards the development sleeve 5. In this case, the magnets 7 can be disposed stationarily. However, if the magnets 7 are rotated as in the embodiment shown in FIG. 1, clogging of the gap between the elastic blade 9 and the development sleeve 5 with sizable foreign material which happens to be contained in the developer can be prevented with certainty, since the magnetic force exerted on the elastic blade 9 varies slightly but periodically, as in the case of the embodiment shown in FIG. 1. The magnets 7 can be rotated either clockwise or counterclockwise since the magnets 7 serve only to change the pressure exerted on the elastic blade 9.

Figure 8:
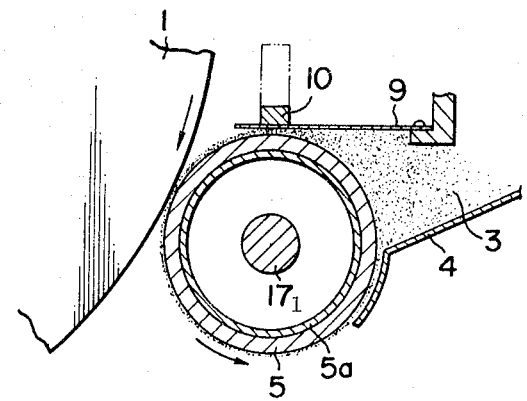
Figure 9:
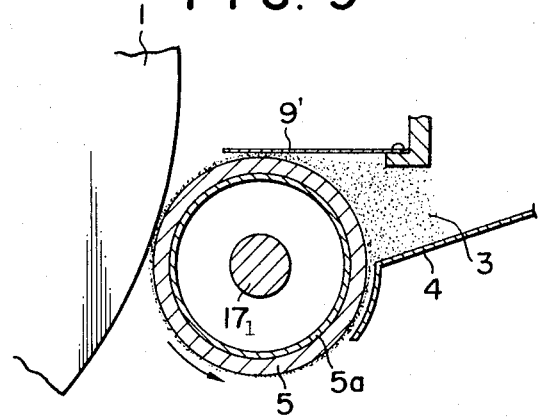

When a non-magnetic developer is employed as in the case of the embodiment shown in FIG. 7, development apparatuses as shown in FIG. 8 and FIG. 9 can be used, in which the pressure application member 10 or 9' is made of a magnet, and a magnetic member $17_1$ is disposed within the development sleeve 5, whereby the pressure application member 10 or 9' is caused to be attracted to the development sleeve 5. When the core member 5a of the development sleeve 5 is made of a magnetic material, it is unnecessary to dispose the magnetic member $17_1$.

Figure 10:
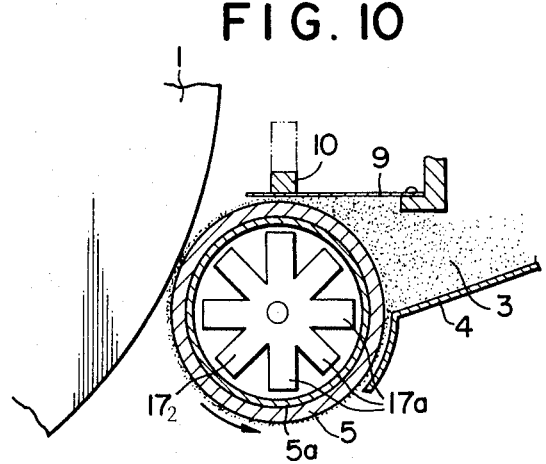

Furthermore, as shown in FIG. 10, when a magnetic member $17_2$ is formed so as to have a plurality of projections $17a$ extending in the axial direction of the development sleeve 5, and is rotated, the functioning of the magnetic member $17_2$ is improved in comparison with the stationary magnetic member $17_1$ shown in FIGS. 8 and 9, since the pressure exerted on the non-magnetic elastic blade 9 is changed slightly but periodically by the slight but periodic change in the magnetic force of the magnetic member $17_2$ exerted on the pressure application member 10, and, therefore, clogging of the gap between the elastic blade 9 and the development sleeve 5, with any sizable foreign material in the developer can be effectively prevented. As a matter of course, the magnetic member 17$_2$ shown in FIG. 10 can be employed in the embodiment shown in FIG. 9.

Figure 11:
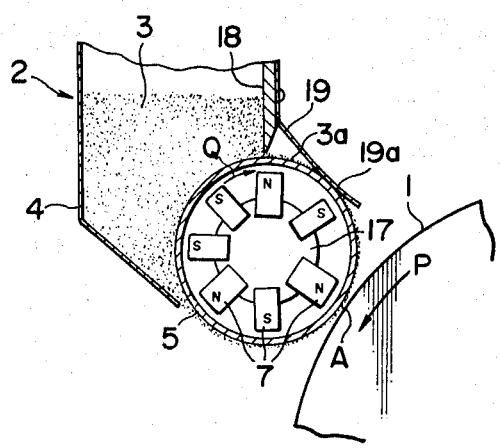
FIG. 11 is a schematic cross-sectional view of a still further embodiment of a development apparatus according to the present invention.

Referring to FIG. 11, there is shown a further embodiment of the development apparatus 2 according to the present invention.

The development apparatus 2 comprises (i) the developer tank 4 which holds a one-component type developer comprising the magnetic developer 3, and (ii) the development sleeve 5 made of a non-magnetic material. Within the development sleeve 5, there is a plurality of magnets 7 which are supported by a shaft 17, with the opposite polarities of the magnets 7 positioned alternately along the inner peripheral surface of the development sleeve 5. In this embodiment, the magnets 7 are fixed, while the development sleeve 5 is rotated clockwise.

When the copying operation is started, the photoconductor drum 1 is driven in rotation in the direction of the arrow P, and a latent electrostatic image is formed on the surface of the photoconductor drum 1 by a latent electrostatic image formation means (not shown). The thus formed latent electrostatic image is transported to the development area A as shown in FIG. 11.

At the same time, the development sleeve 5 is driven in rotation clockwise, in the direction of arrow Q, so that the developer 3 is supplied from the lower opening of the developer tank 4 to the surface of the development sleeve 5. The developer 3 is carried towards a doctor blade 18 for regulating the thickness of the developer layer on the development sleeve 5. The doctor blade 18 serves as an auxiliary member for regulating the thickness of the developer layer on the development sleeve 5. In addition to the doctor blade 18, there is disposed a pressure application member 19, which is made of a elastic magnetic material, such as iron, nickel or an alloy of those metals, and extends so as to cover almost the entire width of the development sleeve 5. One end portion of the pressure application member 19 is fixed to the doctor blade 18, and the other end portion 19a of the pressure application member 19 is free and attracted towards the development sleeve 5 by the magnetic force of the magnets 7 disposed within the development sleeve 5. While the developer 3 passes through the gap between the pressure application member 19 and the development sleeve 5, the thickness of the developer layer is regulated as desired, and the developer layer is moved to the development area A. In the development area A, the developer 3 is electrostatically transferred from the development sleeve 5 to the latent electrostatic image formed on the surface of the photoconductor drum 1. For such transfer of the developer 3, the developer 3 is electrically charged to a predetermined polarity. When the volume resistivity of the developer 3 is high, the developer 3 is electrically charged before it reaches the development area A by an appropriate charging means, for instance, by triboelectric charging by a layer (not shown) coated on the development sleeve 5 or by the doctor blade 18, or by charge injection by a corona charger (not shown). In the case where the volume resistivity of the developer 3 is comparatively low, the developer 3 is electrically charged to a predetermined polarity by electrostatic induction by the electric charges of the latent electrostatic image when the developer 3 comes to the development area A. In particular, when the developer 3 is electrically charged by the electrostatic induction method, it is necessary that a developer layer 3a (refer to FIG. 11) be made extremely thin by the doctor blade 18. In order to do this, it is preferable that the doctor blade 18 be made of a magnetic material. The thickness of the thus formed thin developer layer 3a is further accurately regulated by the pressure application member 19.

By use of the development apparatus 2 shown in FIG. 11, the following experiment was conducted:

The doctor blade 18 was made of a magnetic material, and the pressure application member 19 was constructed of a nickel plate with a thickness of 75 $\mu$m. The gap between the doctor blade 18 and the surface of the development sleeve 5 was set at 0.3 mm. By the doctor blade 18, the thickness of the developer layer 3a on the development sleeve 5 was regulated so as to be about 0.1 mm. The thus formed developer layer 3a was further made uniform in thickness by the pressure application member 19. As a result, a clear image was obtained by this development apparatus.

For comparison, the pressure application member 19 was replaced by a mylar film with a thickness of 75 $\mu$m. In the same manner as described above, flattening of the developer layer 3a was attempted. However, a developer layer as uniform as the developer layer obtained by the nickel pressure application member 19 was not obtained.

Figure 12:
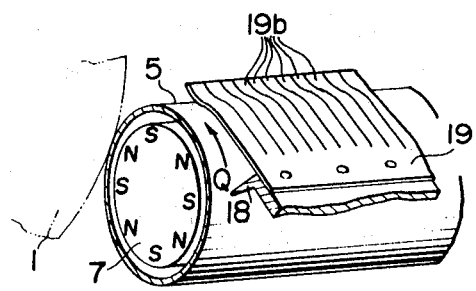
FIG. 12 is a partial perspective view of a further embodiment of a development apparatus according to the present invention.

Referring to FIG. 12, there is partly shown a further embodiment of a development apparatus according to the present invention. In this embodiment, the free end portion of the pressure application member 19, which is made of a magnetic material and is formed so as to be elastic, is divided into multiple segments 19b as shown in FIG. 12. Each segment 19b can be elastically deformed almost independently, s that each segment 19b is attracted towards the surface of the development sleeve 5 by the magnets 7 disposed within the development sleeve 5. As a result, each segment 19b of the pressure application member 19 applies pressure substantially independently to the developer layer formed on the development sleeve 5. Therefore, cylindrical accuracy of the development sleeve 5 and attachment accuracy of the pressure application member 19, such as are required in the conventional developer layer thickness regulation means, are not required in order to form a uniform developer layer on the development sleeve 5. Furthermore, in this embodiment, if any foreign material happens to be mixed with the developer which is transported along the development sleeve 5, clogging of the gap between the pressure application member 19 and the development sleeve 5 with the foreign material can be prevented more surely than with any of the so far explained embodiments of a development apparatus according to the present invention, since the free end segments 19b of the pressure application member 19 can be more elastically deformed than any of the so far explained pressure application members when the foreign material comes under the pressure application member 19. In the embodiment of a development apparatus shown in FIG. 12, a roller-shaped magnet 7 is employed. However, this is effectively the same as the magnets 7 employed in the development apparatus shown in FIG. 11, and no distinction is intended.

In the embodiments shown in FIGS. 11 and 12, the pressure application member 19 is made entirely of a magnetic material and is magnetically attracted towards the development sleeve 5 by the magnets 7 disposed within the development sleeve 5, in order to apply pressure to the developer layer on the development sleeve 5. However, it is not an essential requirement that the entire pressure application member 19 be made of a magnetic material; rather, it is only required that the pressure application member 19 can be magnetically attracted towards the development sleeve 5 by the magnets 7.

Figure 13:
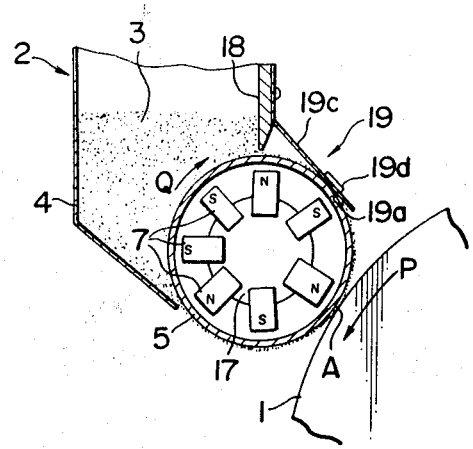
FIGS. 13 to 15 are schematic sectional views of further embodiments of a development apparatus according to the present invention.

Referring to FIG. 13, there is shown a further embodiment of a development apparatus according to the present invention, in which the pressure application member 19 comprises a non-magnetic elastic member 19c, made, for instance, of a mylar film, and a magnetic member 19d, made, for instance, of a magnetic material, such as iron or nickel, which is attached to the free end portion 19a of the elastic member 19c. The other end portion of the elastic member 19c is fixed to the doctor blade 18.

In the embodiments shown in FIGS. 11, 12 and 13, the entire portion or part of the pressure application member 19 is made of an elastic material.

Figure 14:
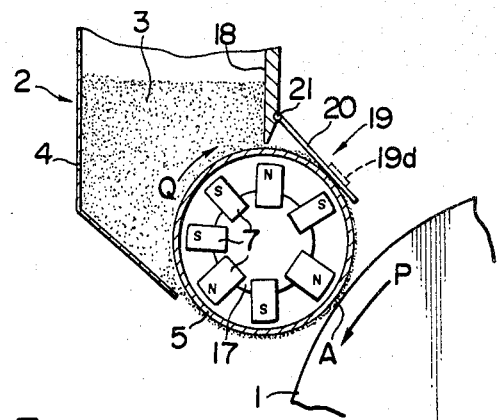

However, as shown in FIG. 14, the pressure application member 19 can be made of a rigid magnetic plate 20, for instance, with one end portion thereof being rotatably attached to the doctor blade 18 by a pin 21. The thus constructed pressure application member 19 can be moved in the direction substantially normal to the surface of the development sleeve 5 and can be magnetically attracted towards the development sleeve 5 for making the developer layer uniform in thickness on the development sleeve 5. In this embodiment, the gap between the magnetic plate 20 and the development sleeve 5 is determined by the magnetic force of the magnets 7 exerted on the magnetic plate 20 and by the amount of the developer present in the gap, and there is no difficulty in setting the gap as desired and maintaining the same.

In contrast to this, if a pressure application plate is made of a non-magnetic material and that pressure application plate is brought into pressure contact with the developer layer only by a mechanical means, it is necessary that the gap be set accurately from the beginning in order to make a uniform developer layer on the development sleeve 5. Even in that case, it is difficult to transport the developer on the peripheral surface of the development sleeve 5 continuously and smoothly.

In the embodiment shown in FIG. 14, the pressure application member 19 can be made of a non-magnetic plate with a magnetic member 19d attached thereto.

Figure 15:
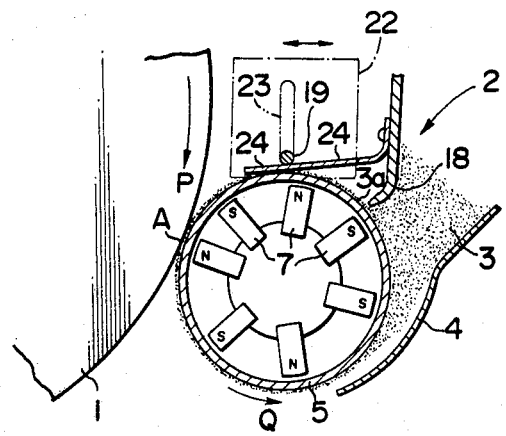

Referring to FIG. 15, there is shown a further embodiment of a development apparatus according to the present invention. In this embodiment, the pressure application member 19 is made of a rod-shaped magnetic material extending in the axial direction of the development sleeve 5. The pressure application member 19 is fitted in sliding contact with slots 23 formed in a pair of support members 22. The slots 23 extend in the direction substantially normal to the peripheral surface of the development sleeve 5 and therefore the rod-shaped pressure application member 19 is supported so as to be movable in the direction substantially normal to the peripheral surface of the development sleeve 5. The pressure application member 19 is disposed on an elastic blade 24 made of a non-magnetic material. One end portion of the elastic blade 24 is fixed to part of the developer tank 4 or to the doctor blade 18, while the other end portion of the elastic blade 24 is in contact with the developer layer 3a on the development sleeve 5.

In this embodiment, the pressure application member 19 is attracted towards the development sleeve 5 by the magnetic force of the magnets 7 exerted on the pressure application member 19, so that pressure is applied to the developer layer on the development sleeve 5 by the pressure application member 19 through the elastic blade 24.

Furthermore, the supporting members 22 for supporting the pressure application member 19 are disposed so as to be movable horizontally in FIG. 15, and by setting the position of the supporting members 22 appropriately, pressure applied to the developer layer on the development sleeve 5 can also be adjusted appropriately.

Figure 16:
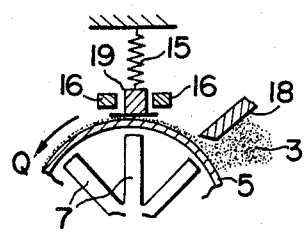
FIG. 16 is a schematic partial sectional view of a further embodiment of a development apparatus according to the present invention.

Referring to FIG. 16, there is partly shown a further embodiment of a development apparatus according to the present invention. In this embodiment, the pressure application member 19 is made of a magnetic material and is supported by a spring 15 in such a manner that the pressure application member 19 is movable in the direction substantially normal to the surface of the development sleeve 5. The pressure application member 19 is also positioned in the magnetic field of the magnets 7 disposed within the development sleeve 5, whereby pressure can be applied to the developer layer on the development sleeve 5 so as to make the developer layer uniform in thickness as desired. Reference numerals 16 represent a holding member for positioning the pressure application member 19 at the desired position, which holding member 16 is used as necessary.

Figure 17:
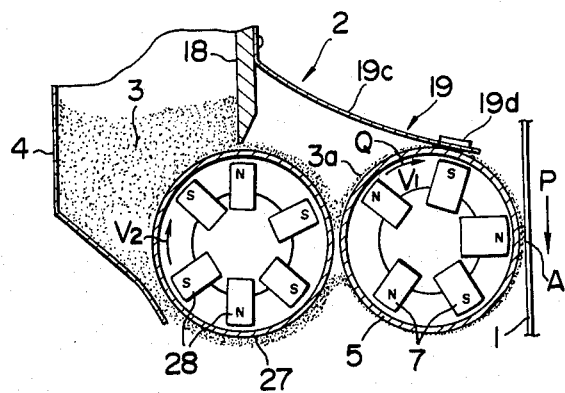
FIG. 17 is a schematic cross-sectional view of a further embodiment of a development apparatus according to the present invention, which development apparatus has a developer supply sleeve in addition to a development sleeve.

Referring to FIG. 17, there is shown a further embodiment of a development apparatus according to the present invention. In this embodiment, there is disposed a developer supply sleeve 27 at the lower opening of the developer tank 4 in which the developer 3 is held. In close proximity to the developer supply sleeve 27, there is disposed the development sleeve 5. Within the development sleeve 5, there is disposed a plurality of stationary magnets 7, and within the developer supply sleeve 27, there is also disposed a plurality of stationary magnets 28. The developer supply sleeve 27 and the development sleeve 5 are driven in rotation clockwise. The peripheral speed $V_1$ of the development sleeve 5 is greater than the peripheral speed $V_2$ of the developer supply sleeve 27. In FIG. 17, reference numeral 1 represents a photoconductor formed in the shape of a sheet, which is disposed in close proximity to the surface of the development sleeve 5. As a matter of course, the sheet-shaped photoconductor can be replaced by the conventional drum-shaped photoconductor.

When the copying operation is started, the two sleeves 27 and 5 are driven in rotation clockwise, so that the developer 3 is supplied from the developer tank 4 to the surface of the developer supply sleeve 27, and is transported clockwise on the developer supply sleeve 27. The thickness of the developer layer on the developer supply sleeve 27 is regulated by the doctor blade 18. The regulation of the thickness of the developer layer by the doctor blade 18 is performed preliminarily and that thickness is much greater than the intended thickness of the developer layer on the development sleeve 5.

When the developer comes to the area where the surface of the developer supply sleeve 27 is positioned most closely to the surface of the development sleeve 5, the developer is transferred from the developer supply sleeve 27 to the development sleeve 5 by the magnetic action of the magnets 28 and 7, which are respectively disposed within the developer supply sleeve 27 and the development sleeve 5. Since the peripheral speed $V_1$ of the development sleeve 5 is greater than the peripheral speed $V_2$ of the developer supply sleeve 27, the developer present in a unit area of the developer supply sleeve 27 is spread to a greater area of the development sleeve 5 when the developer is transferred from the developer supply sleeve 27 to the development sleeve 5 and, therefore, the thickness of the developer transferred to the development sleeve 5 is reduced to the desired thickness, in comparison with the thickness of the developer layer on the developer supply sleeve 27. The developer transferred to the development sleeve 5 is transported clockwise as the surface of the development sleeve 5 is rotated clockwise.

As described above, in this embodiment, the thickness of the developer layer is reduced within the magnetic field generated between the developer supply sleeve 27 and the development sleeve 5 when it is transferred from the developer supply sleeve 27 to the development sleeve 5. However, if the intensity of the magnetic field between the developer supply sleeve 27 and the development sleeve 5 is not constantly uniform, the thickness of the developer layer 3a on the development sleeve 5 will become non-uniform. In order to minimize such non-uniformity in the thickness of the developer layer 3a, the pressure application member 19 for applying pressure to the developer layer 3a is disposed as shown in FIG. 17. The pressure application member 19 comprises the elastic member 19c, one end portion of which is fixed to the doctor blade 18 or part of the developer tank 4, and the magnetic member 19d which is attached to the other free end portion of the elastic member 19c. By the pressure application member 19, the developer layer on the development sleeve 5 is made uniform in thickness as in the case of the embodiment shown in FIG. 13, by eliminating non-uniformity, if any, in the developer layer on the developer supply sleeve 27. This effect was confirmed by an experiment in which a mylar film layer with a thickness of 75 μm was employed as the elastic member 19c, and a nickel plate with a thickness of 75 μm was employed as the magnetic member 19d.

The method of reducing or regulating the thickness of the developer layer by utilizing the difference between the peripheral speed $V_1$ of the development sleeve 5 and the peripheral speed $V_2$ of the developer supply sleeve 27 can be applied to any of the embodiments so far shown.

Figure 18:
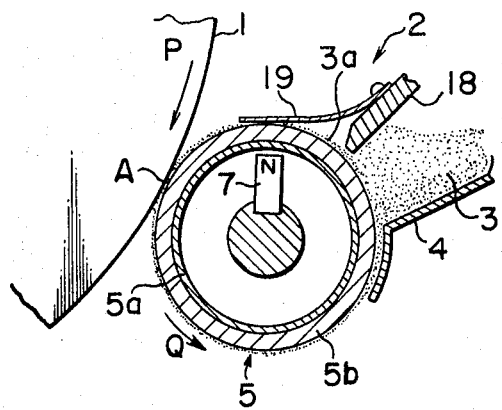
FIGS. 18 to 20 are schematic cross-sectional views of further embodiments of a development apparatus according to the present invention, in which a non-magnetic developer is employed.

Referring to FIG. 18, there is schematically shown a further embodiment of a development apparatus according to the present invention, in which a non-magnetic developer is employed.

In this embodiment, the developer sleeve 5 comprises a core member 5a and an electrically conductive elastic layer 5b which covers the core member 5a. When the development sleeve 5 is rotated counterclockwise, the non-magnetic developer 3 is supplied from the developer tank 4 onto the surface of the development sleeve 5 and is then transported to the development area A, where the non-magnetic developer 3 is electrostatically transferred to a latent electrostatic image formed on the surface of the photoconductor drum 1, so that the latent electrostatic image is developed to a visible image. In this embodiment, in order to regulate the thickness of the developer layer on the development sleeve 5, there is disposed the doctor blade 18. The developer layer 3a with the thickness thereof being regulated by the doctor blade 18 is further made uniform in thickness by the pressure application member 19, which is made of a magnetic material. Generally, in the development apparatus for use with non-magnetic developer, magnets for transporting the developer along the development sleeve 5 are unnecessary. However, in the embodiment shown in FIG. 18, the magnet 7 is disposed in order to magnetically attract the pressure application member 19 towards the development sleeve 5, thereby regulating the thickness of the developer layer on the development sleeve 5.

Figure 19:
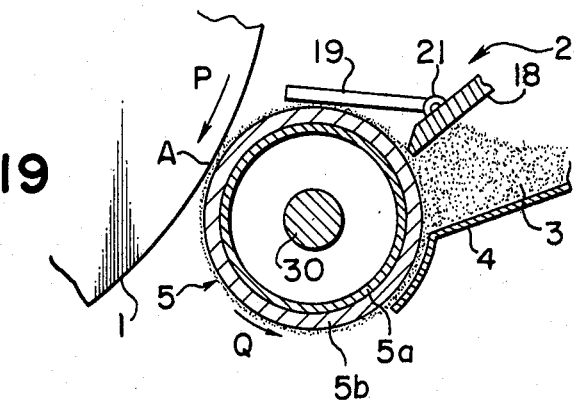

Referring to FIG. 19, there is shown a further embodiment of a development apparatus according to the present invention, in which a non-magnetic developer is employed.

In this embodiment, the pressure application member 19 is made of a magnet, and one end portion of which is swingably attached to the doctor blade 18 through a pin 21, and the other end portion of which is free and movable in the direction substantially normal to the surface of the development sleeve 5, and inside the development sleeve 5, there is disposed a magnetic member 30, thereby attracting the pressure application member 19 towards the development sleeve 5. When the core member 5a of the development sleeve 5 is made of a magnetic material, it is unnecessary to dispose the magnetic member 30 within the development sleeve 5, since the pressure application member 19 is attracted towards the development sleeve 5 due to the magnetic attraction between the pressure application member 19 made of a magnet and the core member 5a made of a magnetic material.

Figure 20:
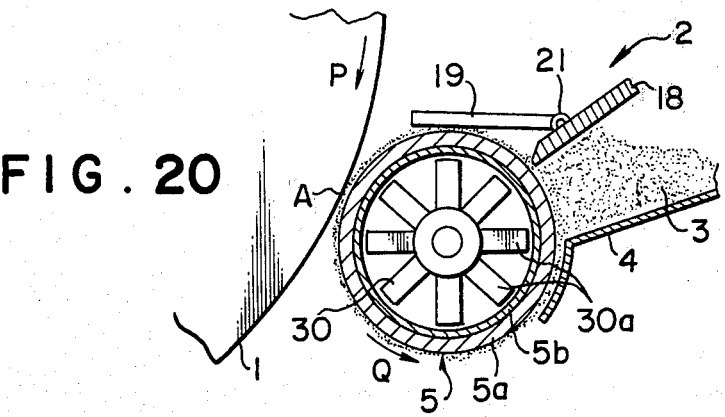

Referring to FIG. 20, there is shown a further embodiment of a development apparatus according to the present invention, in which a non-magnetic developer is employed.

In this embodiment, there is disposed a magnetic member 30 within the development sleeve 5, which magnetic member 30 has a plurality of projections 30a directed towards the inner peripheral surface of the development sleeve 5 and extending in the axial direction of the development sleeve 5 as shown in FIG. 20. The pressure application member 19 is made of a magnet and one end portion of which is swingably attached to the doctor blade 18 through the pin 21 as in the embodiment shown in FIG. 19. The magnetic member 30 is driven in rotation. Therefore, the intensity of the magnetic field generated between the pressure application member 19 and the magnetic member 30 changes slightly but periodically during the rotation of the magnetic member 30. Accordingly, the magnetic attracting force exerted on the pressure application member 19 towards the development sleeve 5 also changes slightly but periodically. This slight but periodical change in the attracting force exerted on the pressure application member 19 serves to prevent clogging of the gap between the pressure application member 19 and the surface of the development sleeve 5 with foreign material which happens to be mixed with the developer, since the foreign material can be passed through the gap when the magnetic attracting force exerted on the pressure application member 19 is decreased and the space of the gap is increased. However, if the change in the intensity of the magnetic field is great, and, therefore, the magnetic attracting force exerted on the pressure application member 19 changes greatly, there is the risk that concave and convex portions will be formed in the developer layer by the pressure application member 19. In this sense, it is required that the magnetic member 30 be rotated at such a high speed that the thickness of the developer layer be made uniform and, in the mean time, sizable foreign material, if any, is allowed to pass through the gap between the pressure application member 19 and the development sleeve 5.

The embodiments described above are intended to be merely exemplary and those skilled in the art will be able to make variations and modifications in them without departing from the spirit and scope of the invention.

For instance, referring to FIG. 12, only the free end portions of the pressure application member 19 is divided into multiple segments. However, it can be modified to divide the entire pressure application member 19. Furthermore, a variety of pressure application members described, for instance, each can be combined with the development sleeves described above.

What is claimed is:

1. In a development apparatus for developing a latent electrostatic image formed on a latent electrostatic image bearing member to a visible image, having a developer transportation means for transporting a developer to the latent electrostatic image for developing the same to a visible image, and a developer layer thickness regulating means for regulating the thickness of a developer layer on said developer transportation means, the improvement wherein said developer layer thickness regulation means comprises a pressure application member for applying pressure to the developer layer on said developer transportation means by the magnetic force exerted on said pressure application member towards said developer transportation means, said pressure application member being supported so as to be movable in the direction substantially normal to the surface of said developer transportation means.

2. A development apparatus as claimed in claim 1, wherein at least part of said pressure application member is made of a magnetic material, and said developer transportation means include an inner magnet, whereby said pressure application member is magnetically attracted towards said developer transportation means, applying pressure to said developer carried on said developer transportation means.

3. A development apparatus as claimed in claim 1, wherein at least part of said pressure application member is made of a magnet, and said developer transportation means include a magnetic material, whereby said pressure application member is magnetically attracted towards said developer transportation means, applying pressure to said developer carried on said developer transportation means.

4. A development apparatus as claimed in claim 2, wherein said developer transportation means is a non-magnetic development sleeve, on the outer peripheral surface of which said developer is transported, and which development sleeve has a rotatable inner magnet within said development sleeve, and said pressure application member is a rod-shaped magnetic member disposed on an elastic blade, one end portion of which is attached to part of said development apparatus, and the other end portion of which is set free, through which elastic blade, pressure is applied to said developer layer on said development sleeve.

5. A development apparatus as claimed in claim 2, wherein said developer transportation means is a non-magnetic development sleeve, on the outer peripheral surface of which said developer is transported, and which development sleeve has a rotatable inner magnet within said development sleeve, and said pressure application member is a coil spring member disposed on an elastic blade, one end portion of which is attached to part of said development apparatus, and the other end portion of which is set free, through which elastic blade, pressure is applied to said developer layer on said development sleeve.

6. A development apparatus as claimed in claim 2, wherein said developer transportation means is a non-magnetic development sleeve, on the outer peripheral surface of which said developer is transported, and which development sleeve has a rotatable inner magnet within said development sleeve, and said pressure application member is supported by a support member so as to be movable along an elastic blade, one end portion of which is attached to part of said development apparatus, and the other end portion of which is set free, through which elastic blade, pressure is applied to said developer layer on said development sleeve, and the gap between said elastic blade and the surface of said development sleeve can be adjusted by changing the position of said support member.

7. A development apparatus as claimed in claim 2, wherein said developer transportation means is a non-magnetic development sleeve, on the outer peripheral surface of which said developer is transported, and which development sleeve has a rotatable inner magnet within said development sleeve, and said pressure application member is an elastic blade made of a magnetic material, one end portion of which is attached to part of said development apparatus, and the other end portion of which is set free, which elastic blade applies pressure to said developer layer on said development sleeve by the magnetic attracting force exerted on said elastic blade in the direction towards the surface of said development sleeve.

8. A developer apparatus as claimed in claim 2, wherein said developer transportation means is a development sleeve comprising a core member and an electrically conductive elastic layer which covers said core member, on the outer peripheral surface of which said developer is transported, and which development sleeve has a rotatable inner magnet within said development sleeve, and said pressure application member is a rod-shaped magnetic member disposed on an elastic blade made of a non-magnetic material, one end portion of which is attached to part of said development apparatus, and the other end portion of which is set free, through which elastic blade, pressure is applied to said developer layer on said development sleeve.

9. A development apparatus as claimed in claim 2, wherein said developer transportation means is a non-magnetic development sleeve, on the outer peripheral surface of which said developer is transported, and which development sleeve has a rotatable inner magnet within said development sleeve, and said pressure application member comprises an elastic blade made of a non-magnetic material, one end portion of which is attached to part of said development apparatus, and the other end portion of which is set free, and a magnetic member attached to said free end portion of said elastic blade, which elastic blade applies pressure to said developer layer on said development sleeve by the magnetic attracting force exerted on said magnetic member attached to said elastic blade in the direction towards the surface of said development sleeve.

10. A development apparatus as claimed in claim 2, wherein said developer transportation means is a non-magnetic development sleeve, on the outer peripheral surface of which said developer is transported, and which development sleeve has a rotatable inner magnet within said development sleeve, and said pressure application member comprises a rigid plate made of a non-magnetic material, one end portion of which is swingably attached through a pin to part of said development apparatus, and the other end portion of which is set free, and a magnetic member attached to said free end portion of said rigid plate, which rigid plate applies pressure to said developer layer on said development sleeve by the magnetic attracting force exerted on said magnetic member attached to said rigid plate in the direction towards the surface of said development sleeve.

11. A development apparatus as claimed in claim 2, wherein said developer transportation means is a non-magnetic development sleeve, on the outer peripheral surface of which said developer is transported, and which development sleeve has a rotatable inner magnet within said development sleeve, and said pressure application member is a magnetic member which is held by a spring means in such a manner that said magnetic member is movable in the direction normal to the surface of said development sleeve.

12. A development apparatus as claimed in claim 3, wherein said developer transportation means is a non-magnetic development sleeve, on the outer peripheral surface of which said developer is transported, and which development sleeve has a magnetic member within said development sleeve, and said pressure application member is a magnet disposed on a non-magnetic elastic blade, one end portion of which is attached to part of said development apparatus, and the other end portion of which is set free, through which elastic blade, pressure is applied to said developer layer on said development sleeve.

13. A development apparatus as claimed in claim 12, wherein said magnetic member disposed within said development sleeve has a plurality of projections extending towards the inner peripheral surface of said development sleeve, said projections being arranged in the axial direction of said development sleeve.

14. A development apparatus as claimed in claim 3, wherein said developer transportation means is a non-magnetic development sleeve, on the outer peripheral surface of which said developer is transported, and which development sleeve has a magnetic member within said development sleeve, and said pressure application member is an elastic blade made of a magnet, one end portion of which is attached to part of said development apparatus, and the other end portion of which is set free, through which elastic blade, pressure is applied to said developer layer on said development sleeve.

15. A development apparatus as claimed in claim 3, wherein said developer transportation means is a development sleeve comprising a core member and an electrically conductive elastic layer which covers said core member, on the outer peripheral surface of which said developer is transported, and which development sleeve has a magnetic member within said development sleeve, and said pressure application member is a magnet disposed on an elastic blade made of a non-magnetic material, one end portion of which is attached to part of said development apparatus, and the other end portion of which is set free, through which elastic blade, pressure is applied to said developer layer on said development sleeve.

16. A development apparatus as claimed in claim 3, wherein said developer transportation means is a development sleeve comprising a core member and an electrically conductive elastic layer which covers said core member, on the outer peripheral surface of which said developer is transported, and which development sleeve has a magnetic member within said development sleeve, and said pressure application member is a rigid plate made of a magnet, one end portion of which is swingably attached to part of said development apparatus, and the other end portion of which is set free, through which rigid plate, pressure is applied to said developer layer on said development sleeve.

17. A development apparatus as claimed in claim 16, wherein said magnetic member disposed within said development sleeve has a plurality of projections directed towards the inner peripheral surface of said development sleeve and extending in the axial direction of said development sleeve.

18. A development apparatus as claimed in claim 4, 5, 6, or 7, wherein the free end portions of said elastic blade is divided in multiple segments in the developer transporting direction.

19. A development apparatus as claimed in any one of claims 4 through 17, further comprising a developer supply sleeve for supplying said developer from a developer tank to said development sleeve.

20. A development apparatus as claimed in any one of claims 4 through 17, further comprising a doctor blade for regulating the thickness of said developer layer on said development sleeve before said developer layer is regulated in thickness by said pressure application member.

* * * * *